United States Patent
Winter

(10) Patent No.: US 7,267,014 B2
(45) Date of Patent: Sep. 11, 2007

(54) METER REGISTER HAVING AN ENCODER

(75) Inventor: Dan Winter, Pardessia (IL)

(73) Assignee: Arad Measuring Technologies Ltd., Yokneam (IL)

( * ) Notice: Subject to any disclaimer, the term of this patent is extended or adjusted under 35 U.S.C. 154(b) by 0 days.

(21) Appl. No.: 11/228,031

(22) Filed: Sep. 15, 2005

(65) Prior Publication Data

US 2006/0162467 A1 Jul. 27, 2006

Related U.S. Application Data

(60) Provisional application No. 60/674,423, filed on Apr. 25, 2005, provisional application No. 60/612,339, filed on Sep. 23, 2004.

(51) Int. Cl.
*G01F 1/05* (2006.01)
(52) U.S. Cl. .................................. 73/861.79
(58) Field of Classification Search .......... 702/45; 73/275, 861.03, 861.77, 861.78, 861.79
See application file for complete search history.

(56) References Cited

U.S. PATENT DOCUMENTS

| | | | |
|---|---|---|---|
| 2,840,807 A | 6/1958 | Todd et al. | |
| 2,996,713 A | 8/1961 | Boyer | |
| 3,169,398 A | 2/1965 | Sparling et al. | |
| 3,388,388 A | 6/1968 | Brown | |
| 3,518,880 A | 7/1970 | Kullmann et al. | |
| 3,552,208 A | 1/1971 | Destache et al. | |
| 3,580,421 A | 5/1971 | Bickford | |
| 3,641,806 A | 2/1972 | Bruening et al. | |
| 3,646,539 A | 2/1972 | Becker | |
| 3,667,495 A | 6/1972 | Schuler et al. | |
| 3,676,875 A | 7/1972 | Adams et al. | |
| 3,680,378 A | 8/1972 | Aurilio et al. | |

(Continued)

FOREIGN PATENT DOCUMENTS

DE 19725247 A 12/1998

(Continued)

OTHER PUBLICATIONS

Nobuhiro Kuga et al; "Circular Patch Antennas Miniaturized by Shorting Posts"; *Electronics and Communications in Japan*, Part 1, vol. 79, No. 6, 1996, pp. 51-58; © 1996 Scripta Technica, Inc.

*Primary Examiner*—Jewel Thompson
(74) *Attorney, Agent, or Firm*—The Webb Law Firm

(57) ABSTRACT

A water meter register has a shaft for rotating an energy passing wheel having a high transmission portion and a low transmission portion. Energy rays are directed toward one side of the wheel toward a pair of detectors mounted on the other side of the wheel. Each of the detectors generates a first signal when energy passing through the first wheel portion is incident thereon and a second signal when the energy from the devices is incident on the second wheel portion to determine water volume flow rate. In another embodiment, an electronic device acts on the signals from the detectors to provide an adjusted signal that is a more accurate measure of flow rate. In another embodiment, the register includes a plurality of wheels to display measured volume flow, and a stepper motor mount within the wheels to rotate the wheels to present a readable measured volume flow rate.

13 Claims, 4 Drawing Sheets

U.S. PATENT DOCUMENTS

| | | |
|---|---|---|
| 3,685,353 A | 8/1972 | Gestler et al. |
| 3,688,091 A | 8/1972 | Painley |
| 3,701,277 A | 10/1972 | McMahon et al. |
| 3,729,727 A | 4/1973 | Young et al. |
| 3,759,100 A | 9/1973 | Medwig et al. |
| 3,798,634 A | 3/1974 | Kamada |
| 3,806,904 A | 4/1974 | Weinberger et al. |
| 3,813,597 A | 5/1974 | Le Vitt |
| 3,846,789 A | 11/1974 | Germer et al. |
| 3,858,448 A | 1/1975 | Evans et al. |
| 3,949,606 A | 4/1976 | Blancett |
| 4,022,977 A | 5/1977 | Nomura |
| 4,023,410 A | 5/1977 | Althaus |
| 4,032,805 A | 6/1977 | Hereford |
| 4,090,220 A | 5/1978 | Gargini |
| 4,123,758 A | 10/1978 | Shibano et al. |
| 4,134,026 A | 1/1979 | Sone et al. |
| 4,194,180 A | 3/1980 | Noren et al. |
| 4,264,897 A | 4/1981 | Farnsworth |
| 4,305,281 A * | 12/1981 | Lee et al. ............... 73/195 |
| 4,315,523 A | 2/1982 | Mahawili et al. |
| 4,321,531 A | 3/1982 | Marshall et al. |
| 4,327,362 A | 4/1982 | Hoss |
| 4,345,480 A | 8/1982 | Basham et al. |
| 4,359,684 A | 11/1982 | Ley |
| 4,481,805 A | 11/1984 | Dobesh |
| 4,493,988 A | 1/1985 | Ichimura et al. |
| 4,548,084 A | 10/1985 | Onoda et al. |
| 4,636,637 A | 1/1987 | Van Orsdel |
| 4,665,359 A | 5/1987 | Goodwin |
| 4,670,737 A | 6/1987 | Rillins |
| 4,683,472 A | 7/1987 | Beling |
| 4,799,059 A | 1/1989 | Grindahl et al. |
| 4,827,123 A | 5/1989 | Gray |
| 4,829,164 A | 5/1989 | Rudolph et al. |
| 4,841,782 A | 6/1989 | Buchanan |
| 4,896,105 A | 1/1990 | Engel et al. |
| 4,911,010 A | 3/1990 | Foran, Jr. et al. |
| 4,918,994 A | 4/1990 | Kramer |
| 4,996,888 A | 3/1991 | Foran, Jr. et al. |
| 5,000,041 A | 3/1991 | Miyamoto et al. |
| 5,111,407 A | 5/1992 | Galpern |
| 5,138,888 A | 8/1992 | Walmer, Sr. |
| 5,143,257 A | 9/1992 | Austin et al. |
| 5,197,337 A | 3/1993 | Glasheen |
| 5,199,307 A | 4/1993 | Onoda et al. |
| 5,212,380 A | 5/1993 | Sato et al. |
| 5,251,149 A | 10/1993 | Williams et al. |
| 5,259,251 A | 11/1993 | Brinster et al. |
| 5,284,053 A | 2/1994 | Wadlow et al. |
| 5,298,894 A | 3/1994 | Cerny et al. |
| 5,325,715 A | 7/1994 | Foran, Jr. et al. |
| 5,335,211 A | 8/1994 | Muto et al. |
| 5,442,281 A | 8/1995 | Frisch et al. |
| 5,493,917 A | 2/1996 | Clanin |
| 5,519,387 A | 5/1996 | Besier et al. |
| 5,526,685 A | 6/1996 | Davis |
| 5,530,258 A | 6/1996 | Crowne |
| 5,540,107 A | 7/1996 | Silverman et al. |
| 5,621,419 A | 4/1997 | Meek et al. |
| 5,659,300 A | 8/1997 | Dresselhuys et al. |
| 5,673,053 A | 9/1997 | Marthinsson |
| 5,691,484 A | 11/1997 | Feller |
| 5,726,646 A | 3/1998 | Bane et al. |
| 5,748,104 A | 5/1998 | Argyroudis et al. |
| 5,789,672 A | 8/1998 | Rogers et al. |
| 5,825,303 A | 10/1998 | Bloss, Jr. et al. |
| 5,831,176 A | 11/1998 | Morganthale et al. |
| 5,874,732 A | 2/1999 | Giles |
| 5,877,703 A | 3/1999 | Bloss, Jr. et al. |
| 5,927,400 A | 7/1999 | Bononi et al. |
| 5,929,345 A | 7/1999 | Gadini |
| 5,959,550 A | 9/1999 | Giles |
| 5,965,826 A | 10/1999 | Von Bertrab |
| 5,966,010 A | 10/1999 | Loy et al. |
| 5,986,574 A | 11/1999 | Colton |
| 5,996,806 A | 12/1999 | Vikiö |
| 6,012,339 A | 1/2000 | Genack et al. |
| 6,079,263 A | 6/2000 | Beddies |
| 6,079,281 A | 6/2000 | Oszajca et al. |
| 6,085,599 A | 7/2000 | Feller |
| 6,087,957 A | 7/2000 | Gray |
| 6,098,456 A | 8/2000 | Munck |
| 6,115,677 A | 9/2000 | Perthold et al. |
| 6,133,850 A | 10/2000 | Moore |
| 6,177,883 B1 | 1/2001 | Jennetti et al. |
| 6,181,294 B1 | 1/2001 | Porter et al. |
| 6,232,593 B1 | 5/2001 | Tunisuchi et al. |
| 6,232,885 B1 | 5/2001 | Ridenour et al. |
| 6,255,748 B1 | 7/2001 | Allcorn |
| 6,257,074 B1 | 7/2001 | Kellerman |
| 6,271,523 B1 | 8/2001 | Weaver et al. |
| 6,284,129 B1 | 9/2001 | Giordano et al. |
| 6,333,626 B1 | 12/2001 | Edwards |
| 6,346,914 B1 | 2/2002 | Annaman |
| 6,502,468 B1 | 1/2003 | Thornborough |
| 6,604,434 B1 | 8/2003 | Hamilton et al. |
| 6,611,769 B2 * | 8/2003 | Olson ..................... 702/45 |
| 6,612,188 B2 | 9/2003 | Hamilton |
| 6,617,978 B2 | 9/2003 | Ridenour et al. |
| 6,681,645 B1 | 1/2004 | Feller |
| 6,710,721 B1 | 3/2004 | Holowick |
| 6,755,148 B2 | 6/2004 | Holowick |
| 6,784,417 B2 | 8/2004 | Sonoki |
| 2001/0024165 A1 | 9/2001 | Steen, III et al. |
| 2002/0039068 A1 | 4/2002 | Holowick |
| 2002/0083778 A1 | 7/2002 | Hamilton |
| 2003/0025612 A1 | 2/2003 | Holmes et al. |
| 2003/0150280 A1 | 8/2003 | Meistermann |
| 2003/0234350 A1 | 12/2003 | Lesniak |

FOREIGN PATENT DOCUMENTS

| | | |
|---|---|---|
| DE | 299 05 184 U1 | 6/1999 |
| EP | 0 274 573 A | 7/1988 |
| EP | 0278070 A | 8/1988 |
| EP | 1079207 A | 2/2001 |
| FR | 1331112 A | 6/1963 |
| FR | 2 740 216 A1 | 4/1997 |
| FR | 2 850 748 A | 8/2004 |
| GB | 2101782 A | 1/1983 |
| GB | 2123556 A | 2/1984 |
| GB | 2 230 629 A | 10/1990 |
| GB | 2326002 A | 12/1998 |
| JP | 11-110682 | 4/1999 |
| WO | WO99/13676 A | 3/1999 |
| WO | WO9949680 A | 9/1999 |
| WO | WO 02/073735 A2 | 9/2002 |
| WO | WO 2004/111576 A3 | 12/2004 |

* cited by examiner

METER REGISTER HAVING AN ENCODER

CROSS REFERENCE TO RELATED APPLICATIONS

This application claims the benefit of Provisional Application Ser. No. 60/612,339, filed Sep. 23, 2004, for a "Meter Register Having An Encoder" and of Provisional Application Ser. No. 60/674,423, filed Apr. 25, 2005, for a "Meter Register Having An Encoder". Provisional Application Ser. Nos. 60/612,339 and 60/674,423 are hereby incorporated by reference in their entirety.

The non-limiting embodiments of the present invention relate to the subject matter of U.S. patent application Ser. No. 10/864,312, filed Jun. 9, 2004, in the name of Dan Winter for "Meter Register Having An Encoder For Measuring Material Flow And An Algorithm To Selectively Block Signal Transmission" (hereinafter also referred to as "application Ser. No. 10/864,312"), and U.S. patent application Ser. No. 10/864,308, filed Jun. 9, 2004, in the names of Ronald Koch and Dan Winter for "Meter Register and Remote Meter Reader Utilizing A Stepper Motor" (hereinafter also referred to as "application Ser. No. 10/864,308"), which applications are hereby incorporated by reference in their entirety.

BACKGROUND OF THE INVENTION

1. Field of the Invention

The present invention relates to a meter register having an encoder, e.g., a visible light or infrared encoder, for measuring material flow, e.g., flow volume per unit time, and flow direction of water; to a method of adjusting the measured flow volume signal to more closely represent the actual flow volume per unit time flowing through the meter; and to an improved, mechanically-driven odometer.

2. Description of Related Art

One technique to determine utility consumption is to visually read the utility meters. The meters, such as water meters, include an odometer that indicates the amount of water consumed. The odometer is read periodically and the difference between the present and the prior reading determines the amount of water used. This procedure of individually and visually reading water meters is time consuming, labor intensive, and expensive. To overcome this drawback, remote reading systems were developed.

One such system is described in PCT Publication No. WO 02/073735 (hereinafter also referred to as "WO 02/073735") to Winter and titled "Meter Register". WO 02/073735 discloses a sealed meter register having a magnetic follower coupled to a gear. The gear includes a magnet that co-acts with one or more reed switch sensors. The reed switch sensors are coupled to a circuit board that determines the volume that flows through the meter by counting the number of pulses generated by the magnet co-acting with the reed switches. Then, the register circuitry forwards a signal that causes a radio wave to be transmitted or emitted by the meter register and picked up by a transmitter external of the meter register.

Although the meter register of WO 02/073735 is acceptable, there are limitations. More particularly, the use of reed switches and magnets on a wheel are rather expensive and, due to their mechanical nature, can fail in the field. The limitations of the meter register of WO 02/073735 are overcome by the encoder disclosed in application Ser. No. 10/864,312. In general, the encoder of application Ser. No. 10/864,312 has three electromagnetic wave emitters, e.g., infrared emitters, to measure water flow and direction of water flow through the meter. Two of the three spaced emitters are energized at predetermined time intervals to direct infrared rays toward a rotating detector wheel having a reflective surface portion. The reflective surface portion of the detecting wheel reflects the infrared rays incident thereon toward a sensor. A microprocessor connected to the sensor acts on signals from the sensor to determine material flow.

A powering arrangement for rotating the detector wheel includes a magnetic drive arrangement driving a gear train drive to rotate a gear mounted on a shaft of the detector wheel. A limitation of the encoder of application Ser. No. 10/864,312 is the expense of the gears.

As can be appreciated by those skilled in the art, it would be advantageous to provide a meter register that reduces the number of gears, or eliminates the gears, in the power arrangement.

Application Ser. No. 10/864,308 discusses the performance curve for meter registers made by various manufacturers. Of particular interest in the discussion is the accuracy of the measuring systems of the meter registers with respect to flow rate per unit time, e.g. but not limiting to the invention, flow volume of water per minute. In general, within a narrow range at low flow rates the measured volume was lower, and in a narrow range of higher flow rates the measured volume was higher than the actual volume of water flowing through the meter.

As can be appreciated, it would be advantageous to (1) provide a meter register that reduces the number of gears, or eliminates the gears, in the power arrangement and (2) provide a technique to measure flow rate per unit time that has minimal, if any, difference between the measured flow volume and the actual flow volume.

SUMMARY OF THE INVENTION

The invention relates to a meter register, e.g., in a non-limiting embodiment of the invention, to a meter register for a water meter. The meter register includes a register body having a rotatable drive shaft coupled thereto, a drive magnet attached to the drive shaft, an energy passing member co-acting with the drive shaft, the member having a first surface, an opposite second surface, a first portion having a predetermined percent transmission to wavelengths of the magnetic spectrum, and a second portion having a predetermined percent transmission to wavelengths of the magnetic spectrum, wherein the first predetermined percent transmission of the first portion is greater than the predetermined percent transmission of the second portion. In a non-limiting embodiment of the invention, the member is a wheel and the first predetermined portion has a transmission of greater than 50 percent, and the second portion has a transmission of less than 10 percent.

The meter register further includes a device or emitter capable of emitting energy in a predetermined wavelength range of the electromagnetic spectrum, e.g., in the wavelength range of greater than 300 nanometers along a path. The device is mounted spaced from the energy passing member, in the path and facing the first surface of the energy passing member. In one non-limiting embodiment of the invention, the emitter is adapted to emit energy wavelengths in the infrared energy range of the electromagnetic spectrum. A pair of detectors are mounted in spaced relationship to one another, and spaced from and facing the second surface of the energy passing member, wherein each of the pair of sensors generates a first signal when energy passing through the first portion of the energy passing member is incident thereon, and each of the detectors generating a second signal when the energy emitted by the device is incident on the second portion of the energy passing member.

In operation, when the drive shaft rotates, the energy passing member rotates and the responsiveness of the pair of sensors to the energy emitted by the emitter in the form of a signal is monitored and the signal acted on to measure the flow volume of water through the meter, direction of flow, or combinations thereof.

The invention further relates to a meter register having a register body having a rotatable drive shaft coupled thereto, a drive magnet attached to the drive shaft, at least one measuring arrangement co-acting with the drive shaft, and generating a signal representing measured flow volume rate of material, and an electronic device acting on the signal to determine the difference between actual flow volume rate of material and the measured flow volume rate of material, and adjusting the signal to provide an adjusted signal, wherein the difference between the flow volume rate represented by the adjusted signal and the actual flow volume rate is less than the difference between the flow volume rate represented by the signal and the actual flow volume rate.

Still further, the invention relates to a meter register, e.g. but not limiting to the invention, a water meter having a register body having a rotatable drive shaft coupled thereto, a drive magnet attached to the drive shaft, a measuring arrangement operationally connected to the drive shaft to measure flow volume of water, a mechanical odometer to display the measured flow volume of material, and a stepper motor positioned within selected ones of wheels of the odometer and acted on by the measuring arrangement to rotate at least one of the wheels of the odometer to present a readable measured amount of water used.

DETAILED DESCRIPTION OF THE INVENTION

Figure 1:
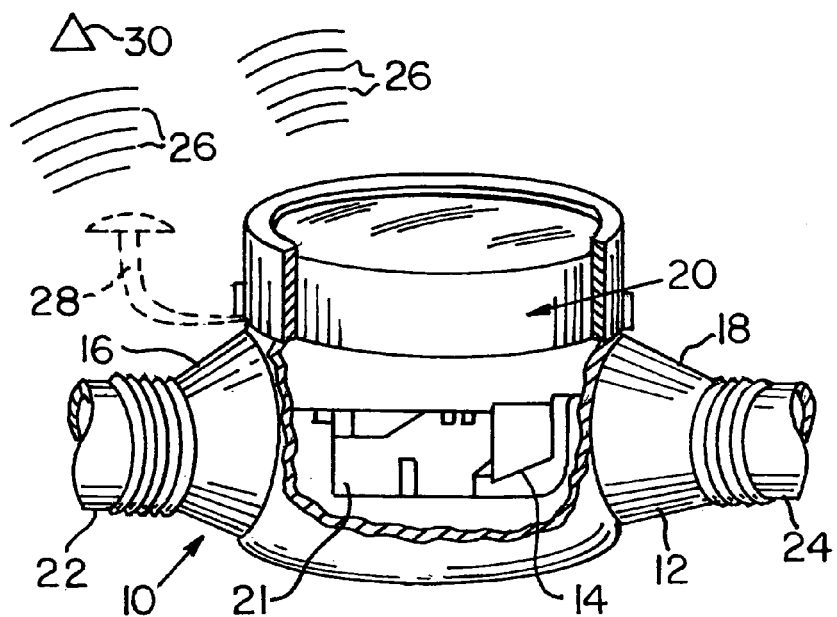
FIG. 1 is a side, orthogonal schematic representation of a meter register made in accordance with the present invention, the meter having auxiliary antenna, the meter register shown in FIG. 1 has portions removed for purposes of clarity.

In the following discussion of the non-limiting embodiments of the invention, spatial or directional terms, such as "inner", "outer", "left", "right", "up", "down", "horizontal", "vertical", and the like, relate to the invention as it is shown in the drawing figures. However, it is to be understood that the invention can assume various alternative orientations and, accordingly, such terms are not to be considered as limiting. Further, all numbers expressing dimensions, physical characteristics, and so forth, used in the specification and claims are to be understood as being modified in all instances by the term "about". Accordingly, unless indicated to the contrary, the numerical values set forth in the following specification and claims can vary depending upon the desired properties sought to be obtained by the practice of the invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 6.3, or 5.5 to 10, or 2.7 to 6.1. Also, as used herein, terms such as "positioned on" or "supported on" mean positioned or supported on but not necessarily in direct contact with the surface.

Further, in the discussion of the non-limiting embodiments of the invention, it is understood that the invention is not limited in its application to the details of the particular non-limiting embodiments shown and discussed since the invention is capable of other embodiments. Further, the terminology used herein is for the purpose of description and not of limitation and, unless indicated otherwise, like reference numbers refer to like elements.

The non-limiting embodiments of the invention are discussed for use on a water meter; however, as will be appreciated, the invention is not limited thereto, and the non-limiting embodiments of the invention can be used with a meter to measure any type of flowable material, e.g. but not limiting the invention thereto, fluids such as water and gas, and granular materials. Although not limiting to the invention, the water meter in the following discussion is of the type disclosed in WO 02/073735 and in application Ser. No. 10/864,308 and application Ser. No. 10/864,312, which documents are hereby incorporated by reference. FIG. 1 herein, which is similar to FIG. 1 of application Ser. No. 10/864,312, shows a water meter 10 having a body 12, a measuring chamber 14, an inlet connection 16, an outlet connection 18, and a meter register 20 incorporating features of the invention. A general discussion of the water meter disclosed in application Ser. No. 10/864,312 is presented herein; for a detailed discussion of the water meter, reference can be made to WO 02/073735 and/or to application Ser. No. 10/864,312.

The body 12 of the water meter 10 is preferably made of a metallic material, such as bronze, copper, or stainless steel, although it can be made of other materials, such as plastic. The measuring chamber 14 can contain any one of the measuring-type arrangements known in the art, such as positive displacement arrangement and/or a vane or a multijet type displacement arrangement. The meter register 20 is preferably sealed and is preferably magnetically coupled to a magnetic drive arrangement 21 in the measuring chamber 14. Magnetic drive arrangements are well known in the art and no further discussion is deemed necessary. The inlet connection 16 and the outlet connection 18 are adapted to be secured to pipes 22 and 24, respectively.

The meter register 20 of the water meter 10 may include an antenna and/or receiver to transmit and/or receive radio frequency ("RF") signals, e.g., radio waves 26, and when the meter is mounted in a pit (not shown) an auxiliary antenna and/or receiver 28, shown in phantom in FIG. 1, is used to mount the antenna and/or receiver outside of the pit. The radio waves 26 are received by a transmission and/or receiving arrangement, e.g., mounted on a stationary tower 30 or on a moving vehicle (not shown).

Figure 2:
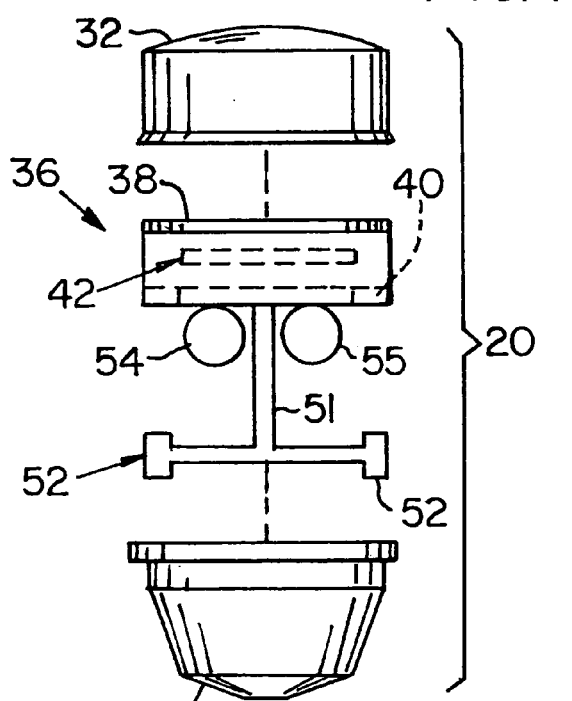
FIG. 2 is an exploded side, elevational view, partially in section, of the register shown in FIG. 1.

With reference to FIG. 2, the register 20 includes a face cap 32 mechanically sealed to cup 34 in any convenient manner. Preferably, the face cap 32 is made of glass or a clear polymeric material, and the cup 34 is made of metal, e.g. but not limiting the invention thereto, copper or stainless steel. Optionally, the metal cup 34 is received in a polymeric shroud (not shown).

Figure 3:
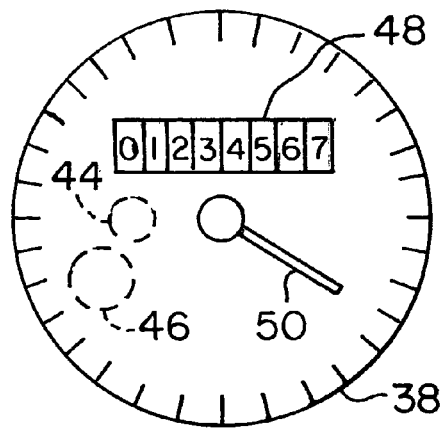
FIG. 3 is a top, perspective view of a face plate and odometer of the register shown in FIGS. 1 and 2.

Referring to FIGS. 2 and 3, within the face cap 32 and the cup 34, the meter register 20 includes a register subassembly 36. The register subassembly 36 includes a faceplate 38 (see FIG. 3), a gear train drive 40, and a direction detection arrangement or encoder 42 incorporating features of the invention. The gear train drive 40 is coupled to a gear drive 44 positioned on the back of the faceplate 38. The gear drive 44 includes meshed gears 46, which drives both an odometer 48 and rotates a sweep hand 50. The gear train drive 40 includes a shaft 51 having a pair of magnets 52. The magnets 52 are rotated by the magnetic drive arrangement 21 (see FIG. 1) to power the gear drive 44. Batteries 54 and 55 power the electronics of the direction detection arrangement 42.

Figure 4:
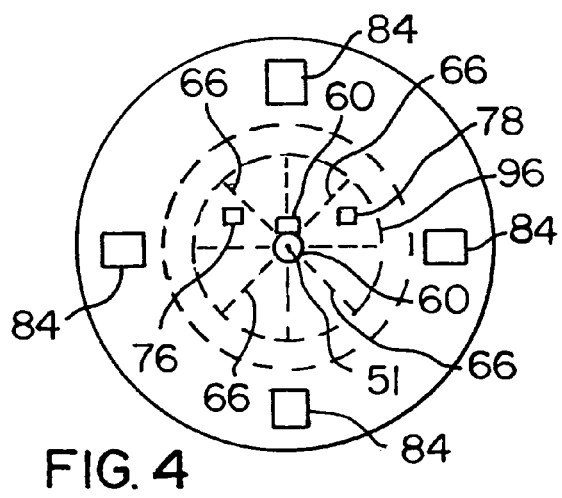
FIG. 4 is a plan view of a non-limiting embodiment of an encoder incorporating features of the invention, the encoder shown in FIG. 4 has portions removed for purposes of clarity.
Figure 5:
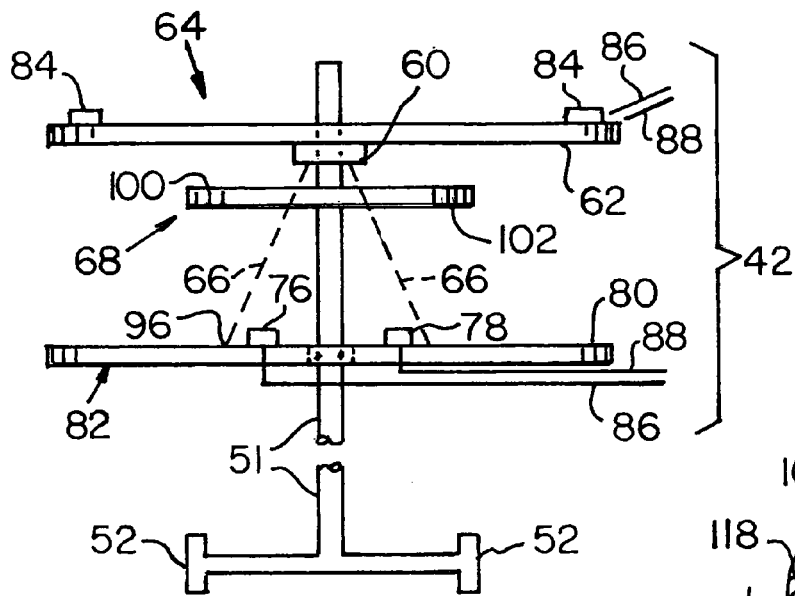
FIG. 5 is a side view of the encoder shown in FIG. 4.
Figure 6:
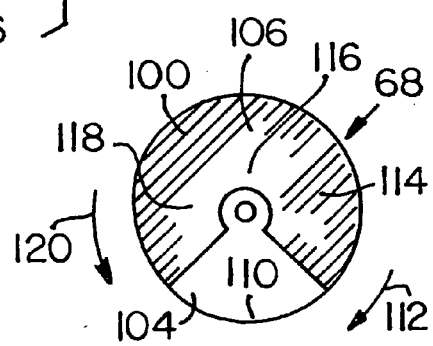
FIG. 6 is a plan view of a non-limiting embodiment of a wheel of the invention that is used with the encoder shown in FIGS. 4 and 5, the wheel having surface portions for selectively passing wavelengths of the electromagnetic spectrum in accordance with the teachings of the invention.

With reference to FIGS. 4-6, a non-limiting embodiment of the direction detection arrangement 42 of the invention includes a device or emitter 60 capable of emitting energy of a predetermined wavelength or, in a predetermined wavelength range, of the electromagnetic spectrum, e.g., above 300 nanometers of the electromagnetic spectrum. The emitter 60 is not limiting to the invention and can be a light-emitting diode ("LED") or infrared ("IR") emitting device.

The device 60 is mounted on bottom surface 62 of printed circuit board 64 to direct energy rays, e.g., diffused energy rays designated by the number 66, toward energy passing member or wheel 68 securely mounted on the shaft 51 connected to the magnets 52 of the gear train drive 40. A portion of the energy rays that pass through selected portions of the energy passing wheel 68 in a manner discussed below are incident on detectors or sensors 76 and 78, e.g., visible light or IR sensors, mounted on upper surface 80 of support 82. The shaft 51 passes through the support 82 and the printed circuit board 64, and rotates the energy passing wheel 68 while the support 82 and the circuit board 64 having the emitter 60 remain stationary. With this arrangement, the energy passing wheel 68 rotates while the emitter 60 and the sensors 76 and 78 remain constant in a relative position to one another. As can be appreciated, the invention contemplates rotating the emitter 60 and the sensors 76 and 78 while the energy passing wheel 68 is stationary.

The printed circuit board 64 has electronics 84 of the meter register 20 and, in one non-limiting embodiment of the invention, includes electronics that receive the output signals from the detectors 76 and 78. More particularly, the output of the detectors 76 and 78 is forwarded in any convenient manner, e.g., along wires 86 and 88 to the electronics 84 of the circuit board 64. The electronics 84 act on the signals from the sensors 76 and 78 to calculate the water consumption and direction of flow, and transmits the information in the form of the radio waves 26 (see FIG. 1). As can be appreciated, the invention is not limited to the electronics for calculating water consumption and/or the receiver/transmitter design for sending the radio waves, and any of the types known in the art can be used in the practice of the invention, e.g. but not limiting to the invention thereto, the embodiments of the electronics and antenna designs discussed in WO 02/073735, application Ser. No. 10/862,308, and application Ser. No. 10/864,312, and used in meter registers sold by Master Meter, Inc. and Arad Technologies Ltd. under the trademark Dialog 3G. The Dialog 3G meter register uses reed switches as discussed in WO 02/073735 to measure water consumption, the optical encoder of the instant invention can be used in the Dialog 3G in place of the reed switches.

With reference to FIGS. 4 and 5, the emitting device 60 is positioned on the bottom surface 62 of the printed circuit board 64 adjacent the shaft 51 such that the area of cone 96 (clearly shown in FIG. 4) of the diffused energy rays 66 incident on the upper surface 80 of the support 82 encompass the sensors 76 and 78 (see FIG. 5). Although not limiting to the invention, the emitting device 60 is located between and equally spaced between the detectors 76 and 78, and spaced above the detectors as clearly shown in FIGS. 4 and 5. The emitting device 60 is attached to the bottom surface 62 of the circuit board 64 and connected to the batteries 54 and 55 in any convenient manner through an on/off switch (not shown) operated by the microprocessor (not shown).

As can be appreciated, the invention is not limited to the emitting device 60 attached to the bottom surface 62 of the printed circuit board 64. For example but not limited to the invention, the sensors 76 and 78 can be attached to or mounted on the bottom surface 62 of the printed circuit board 64, and the emitting device 60 attached to the upper surface 80 of the support 82. Further, in another non-limiting embodiment of the invention, the direction detection arrangement 42 shown in FIG. 5 can be rotated 180° to position the printed circuit board 64 below the support 82. The emitting device 60 or the sensors 76 and 78 can be mounted on the bottom surface of the support 82, and the sensors 76 and 78 or the emitting device 60, respectively, mounted on the upper surface of the circuit board 64.

With reference to FIGS. 5 and 6, the energy passing wheel 68 is securely mounted on the shaft 51 and is positioned between the emitting device 60 and the sensors 76 and 78. The body or one or both surfaces 100 and 102, e.g. but not limiting to the invention, the top surface 100, of the energy passing wheel 68 has a portion 104 having a higher percent energy transmission than the energy transmission of portion 106. The energy transmission difference between the portions 104 and 106 is not limiting to the invention; however, the difference should be sufficient such that the sensors 76 and 78 each can detect energy passing through the area of high transmission, e.g., the portion 104, and energy passing through or block from passing through the area of low transmission, e.g., the portion 106. With this arrangement, the direction detection arrangement 42 of the invention can determine the flow volume, and the direction of water flow, through the meter in a manner discussed below.

In a non-limiting embodiment of the invention, the portion 104 has a transmission to visible light and/or IR preferably of at least 50%, and the portion 106 has a transmission rate to visible light preferably of less than 10%. This arrangement can be accomplished in any convenient manner. More particularly, when the emitting device 60 emits visible light, the energy passing wheel 68 can be made from a clear material, e.g. but not limiting to the invention, from clear glass or clear plastic, and applying a black material, e.g., black paint, over the portion 106 of the energy passing wheel 68. When the emitting device 60 emits IR, the energy passing wheel 68 can be made from a clear material, e.g. but not limiting to the invention, from clear glass or clear plastic, and applying an IR absorbing or reflective material, e.g., a silver coating, over the portion 106 of the energy passing wheel 68.

As seen in FIG. 6, the portion 104 of high transmission has boundaries that subtend a 120° angle and extend around the center of the energy passing wheel 68 and the portion 106 of low transmission has boundaries that subtend a 240° angle. This arrangement is provided because the emitting device 60 is positioned to one side of the shaft 51, as shown in FIG. 4. As can be appreciated, the position of the energy passing wheel 68 relative to the sensors 76 and 78, and the distance of the emitting device 60 to the energy passing wheel 68 and the sensors 76 and 78 is selected such that as the energy passing wheel 68 rotates through a range of 0° to 360°, and depending on the direction of rotation at 0°, the sensors 76 and 78 each sense the presence of energy; as the wheel 68 rotates, one detector, e.g., sensor 76 or 78, senses the presence of energy; as the wheel continues to rotate, neither detector 76 and 78 senses the presence of energy; as the wheel continues to rotate, the other one of the detectors, e.g., 78 or 76, senses the presence of energy; and, at 360°, both detectors 76 and 78 sense the presence of energy.

Although not limiting to the invention, in the preferred embodiment of the invention, the signals from the microprocessor (not shown) mounted on the circuit board 64 closes the off/on switch (not shown) to connect the batteries 54 and 55 to the emitting device 60 to power the emitting device 60. Although not limiting to the practice of the invention and in one non-limiting embodiment of the invention, the microprocessor acts to power the emitting device 60 at the start of water flow through the meter 10 (shown in FIG. 1), i.e., the start of the rotation of the magnets 52, and acts to deactivate the emitting device 60 when the magnets 52 stop rotating or shortly after the magnets stop rotating. Following this procedure, the life of the batteries 54 and 55 can be extended.

With reference to FIG. 6 and Table 1 below, in one non-limiting embodiment of the invention, with position 110 of the energy passing wheel 68 directly below the emitting device 60, the energy rays 66 from the emitting device 60 energize both the detectors 76 and 78; rotating the energy passing wheel 68 in the clockwise direction 112 moves position 114 of the wheel 68 directly under the emitting device 60, the energy rays from the emitting device 60 activate only the detector 76; continued clockwise rotation of the energy passing wheel 68 moves position 116 of the wheel 68 directly under the emitting device 60, and the energy rays 66 of the emitting device 60 are blocked from the detectors 76 and 78 and, therefore, do not activate either one of the sensors 76 and 78; continued clockwise rotation of the energy passing wheel 68 moves position 118 of the energy passing wheel 68 directly under the emitting device 60, and the energy rays 66 of the emitting device 60 activate only the detector 78; continued clockwise rotation of the wheel 68 moves the position 110 of the energy passing wheel 68 directly under the emitting device 60, and the energy rays 66 of the emitting device 60 activate both detectors 76 and 78 to start a repeat of the above cycle of the energy passing wheel moving in a clockwise direction.

As can be appreciated, as the energy passing wheel 68 rotates the position 110 of the wheel 68 away from the emitting device 60 and the position 114 toward the emitting device 60, the amount of energy sensed by the detector 78 decreases, and the amount of energy sensed by the detector 76 remains relatively constant. As the wheel 68 continues to rotate, the position 114 moves away from the emitting device 60 as the position 116 moves toward the device 60, the energy sensed by the detector 76 decreases. As the wheel 68 continues to rotate, the position 116 moves away from the emitting device 60 and the position 118 moves toward the device 60, the energy sensed by the detector 78 increases. As the energy passing wheel 68 continues to rotate, the position 118 moves away from the emitting device 60 as the position 110 moves toward the emitting device 60, the energy sensed by the detector 76 increases.

In another non-limiting embodiment of the invention and with continued reference to FIG. 6 and with reference to Table 2 below, with the emitting device 60 directly above the position 110 of the energy passing wheel 68, the energy rays 66 from the emitting device 60 energize both the sensors 78 and 76; rotating the wheel 68 in the counterclockwise direction 120 moves the position 118 of the wheel 68 directly under the emitting device 60, and the energy rays 66 from the emitting device 60 activates only the detector 78; continued counterclockwise rotation of the wheel 68 moves the position 116 of the energy passing wheel 68 directly under the emitting device 60, and the energy rays 66 of the emitting device 60 are blocked from the sensors 78 and 76 and do not activate either one of the sensors 78 and 76; continued counterclockwise rotation of the wheel 68 moves the position 114 of the energy passing wheel 68 directly under the emitting device 60, and the energy rays 66 of the emitting device 60 activate only the sensor 76; continued counterclockwise rotation of the wheel 68 moves the position 110 of the energy passing wheel 68 under the emitting device 60, and the energy rays 66 of the emitting device 60 activate both the sensors 78 and 76 to start a repeat of the above cycle of the energy passing wheel moving in a counterclockwise direction.

As can be appreciated, as the energy passing wheel 68 moves from the position 110 to the position 118, the amount of energy sensed by the detector 76 decreases, and the amount of energy sensed by the detector 78 remains relatively constant. As the wheel 68 moves from the position 118 to the position 116, the energy sensed by the detector 78 decreases. As the wheel 68 moves from the position 116 to the position 114, the energy sensed by the detector 76 increases. As the wheel 68 moves from the position 114 to the position 110, the energy sensed by the detector 78 increases.

TABLE 1

Status of Detectors 76 and 78 of the Encoder 42 as the Energy Passing Wheel 68 Moves in a Clockwise Direction.

| Position | Detector 76 | Detector 78 |
| --- | --- | --- |
| 110 | On | On |
| 110-114 | On | Reduced on |
| 114 | Reduced on | Off |
| 114-116 | Reduced on | Off |
| 116 | Off | Off |
| 116-118 | Off | Reduced on |
| 118 | Off | Reduced on |
| 118-110 | Reduced on | On |
| 110 | On | On |
| 110-114 | On | Reduced on |
| 114 | Reduced on | Off |

TABLE 2

Status of Detectors 76 and 78 of the Encoder 42 as the Energy Passing Wheel 68 Moves in a Counterclockwise Direction.

| Position | Detector 76 | Detector 78 |
| --- | --- | --- |
| 110 | On | On |
| 110-118 | Reduced on | On |
| 118 | Off | Reduced on |
| 118-116 | Off | Reduced on |
| 116 | Off | Off |
| 116-114 | Reduced on | Off |
| 114 | Reduced on | Off |
| 114-110 | On | Reduced on |
| 110 | On | On |
| 110-118 | Reduced on | On |
| 118 | Off | Reduced on |

In Tables 1 and 2, the designation "Off" means that the energy from the emitting device 60 is passing through the low transmission portion 106 of the energy passing wheel 68. The detector designated as "Off" is receiving no energy, or minimal energy, from the emitting device 60. "Reduced on" indicates that the detector is receiving decreasing amounts of energy as the low transmission portion 106 of the wheel 68 moves under the emitting device 60, or is receiving increasing amounts of energy as the high transmission portion 104 of the wheel 68 moves under the emitting device 60. The designation "On" means that the rays 66 of the emitting device 60 incident on the detector are passing through the high transmission portion 104 of the wheel 68. As can be appreciated, the invention is not limited to a cycle having 8 periods. More particularly, in a non-limiting embodiment of the invention, one cycle is one complete rotation, i.e., 360° rotation of the wheel 68.

Figure 7:
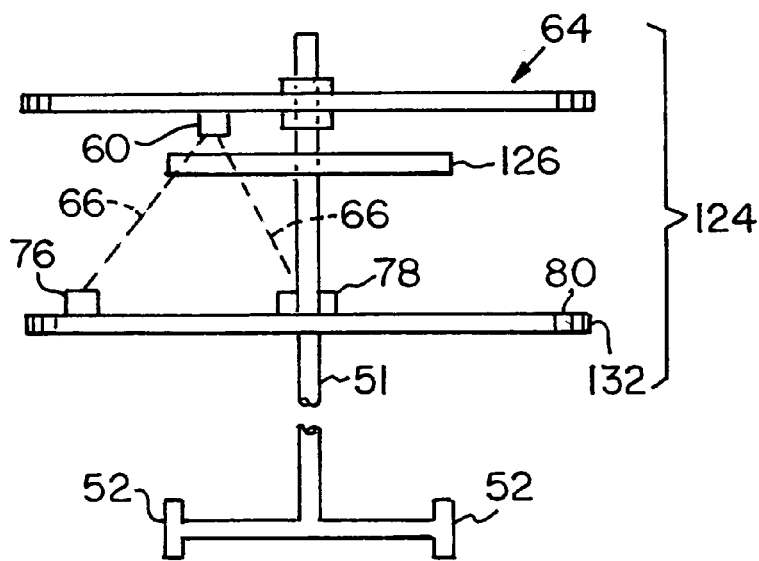
FIG. 7 is a side, elevational view of another non-limiting embodiment of an encoder made in accordance with the present invention.
Figure 8:
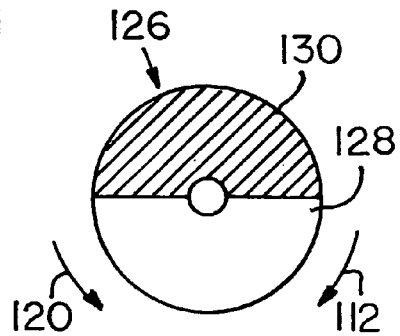
FIG. 8 is a top, plan view of another non-limiting embodiment of a wheel of the invention that is used with the encoder shown in FIG. 7, the wheel having surface portions for selectively passing wavelengths of the electromagnetic spectrum in accordance with the present invention.
Figure 9:
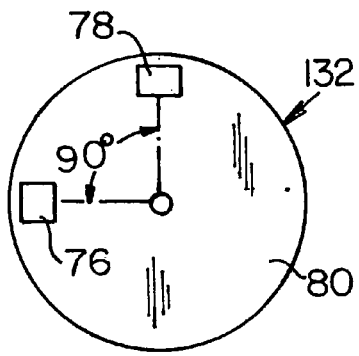
FIG. 9 is a top, plan view of a non-limiting embodiment of a support for sensors used with the encoder shown in FIG. 7.

FIGS. 7-9 show another non-limiting embodiment of an encoder designated by the number 124, similar to the direction detection arrangement or encoder 42 shown in FIGS. 4-6 except for the below noted differences. As shown in FIG. 8, energy passing, member or wheel 126 is similar to the energy passing wheel 68 except that energy passing portion 128 and energy blocking portion 130 each have an angle of approximately 180°, where portion 128 permits energy rays 66 to transmit therethrough in a similar manner as the portion 104 of the wheel 68 and the portion 130 prevents transmission of energy rays in a similar manner as the portion 106 of the wheel 68.

As shown in FIG. 9, the circuit board 64 of the encoder 124 is similar to the circuit board 64 of the direction detection arrangement 42 except the emitting device 60 of the encoder 124 is spaced a greater distance from the shaft 51 than emitter 60 of the encoder 42 (see FIGS. 4 and 5) to provide for the cone 96 of emitted energy from the emitting device 60 of the encoder 42 to encompass the detectors 76 and 78 positioned along the peripheral edge portion of the upper surface 80 of support 132. As shown in FIG. 9, the support 132 has the two sensors or detectors 76 and 78 spaced 90° apart on an upper surface 80 of the support 132. All other elements on the circuit board 64 shown in FIG. 5 and discussed above, which are not shown on the circuit board 64 of the encoder 124 shown in FIG. 7 are considered present on the circuit board 64 of the encoder 124.

In operation, circuit board 64 and support 132 of the encoder 124 remain stationary, while wheel 126 rotates with rotation of the shaft 51 as previously described. The emitted energy rays 66 from the emitting device 60 of the encoder 124 either passes through the portion 128 or are blocked by the portion 130 of the energy passing wheel 126. In a similar manner as discussed above for the sensors 76 and 78 of the encoder 42 shown in FIGS. 4-6, the sensors 76 and 78 of the encoder 124 shown in FIGS. 7-9 can be used to count volume flow rate and direction of flow in a clockwise direction 112 or counterclockwise direction 120.

Below are Tables 3 and 4 showing the status of sensors or detectors 76 and 78 of the encoder 124 as the shaft 51 rotates the wheel 126 in a counterclockwise rotation or in a clockwise rotation. The terms on Tables 3 and 4 that are similar to the terms on Tables 1 and 2 have the same meaning as the terms on Tables 1 and 2.

TABLE 3

Status of Detectors 76 and 78 of the Encoder 124 as the Energy Passing Wheel 126 Moves in a Counterclockwise Direction.

| Detector 76 | Detector 78 |
| --- | --- |
| On | On |
| On | Reduced on |
| Reduced on | Off |
| Off | Off |
| Off | Reduced on |
| Reduced on | On |
| On | On |
| On | Reduced on |
| Reduced on | Off |

TABLE 4

Status of Detectors 76 and 78 of the Encoder 124 as the Energy Passing Wheel 126 Moves in a Clockwise Direction.

| Detector 76 | Detector 78 |
| --- | --- |
| On | On |
| Reduced on | On |
| Off | Reduced on |
| Off | Off |
| Reduced on | Off |
| On | Reduced on |

TABLE 4-continued

Status of Detectors 76 and 78 of the Encoder 124 as the
Energy Passing Wheel 126 Moves in a Clockwise Direction.

| Detector 76 | Detector 78 |
|---|---|
| On | On |
| Reduced on | On |
| Off | Reduced on |

Tables 1-4 were constructed to give an appreciation of the activity of the detectors 76 and 78 of the encoders 42 and 124 as the energy passing wheels 68 and 126, respectively, rotates, and Tables 1-4 are not limiting to the invention.

In the following discussion, reference is made to the encoder 42 shown in FIGS. 4-6; however, unless indicated otherwise, the discussion is applicable to the encoder 124 shown in FIGS. 7-9.

The flow volume through the meter 10 can be determined by measuring the time it takes to complete one revolution of the energy passing wheel 68. Preferably, one revolution is 360° rotation of the wheel 68, which then can correspond to a volume flow and a volume flow rate through the meter.

Figure 10:
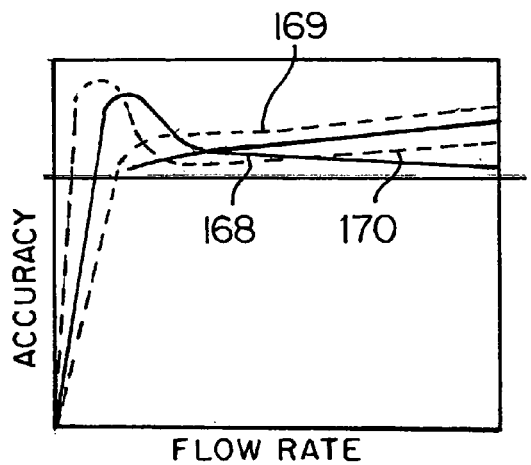
FIG. 10 is a graph showing the accuracy versus flow rate of various meters.

As can be appreciated, the optical encoder of the invention, as well as other types of encoders, e.g., disclosed in application Ser. No. 10/864,308 and application Ser. No. 10/864,312, and WO 02/073735, are powered by the rotation of the magnets, e.g., the magnets 52 shown in FIGS. 2, 5, and 7 which, in turn, are powered by their respective magnetic drive arrangement, e.g., magnetic drive arrangement 21 shown in FIG. 1. One of the limitations with this arrangement is that the rotation of the magnetic drive arrangement is not always indicative of the flow volume of the water moving through the displacement or measuring chamber, e.g., measuring chamber 14 shown in FIG. 1. By way of illustration and not limiting to the invention, FIG. 10 herein, which is similar to FIG. 7A of application Ser. No. 10/864,308, shows the performance curves for different types of meters. For example but not limiting to the invention, for a standard W Series Turbo sold by Sensus, the expected performance curve is curve 168; for a propeller meter sold by Sensus, the expected performance curve is curve 169; and for multi-jet meter (PMM) sold by Sensus, the expected performance curve is curve 170, with respect to accuracy at each flow rate.

Figure 11:
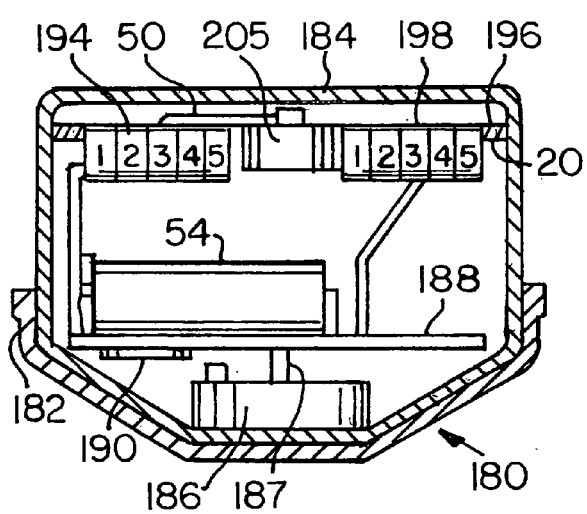
FIG. 11 is a side, elevational view, partially in section, of a meter register made in accordance with the present invention.
Figure 12:
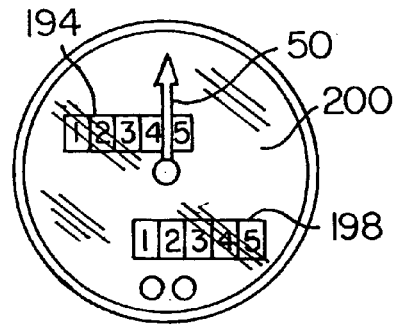
FIG. 12 is a top, plan view of the register shown in FIG. 11.

In accordance with the practice of a non-limiting embodiment of the invention, in the instance where the flow volume is measured electronically, the signal, e.g., voltage variations and/or pulses, representing the measured flow rate can be adjusted to reduce or eliminate the difference between the measured flow rate and the actual flow rate. In this non-limiting embodiment of the invention, the optical encoders 42 and 124 of the invention discussed above, as well as the optical encoder discussed in application Ser. No. 10/864,312, and the magnetic switches discussed in WO 02/073735 and application Ser. No. 10/864,308 can be used to measure volume flow rate. For example but not limiting to the invention, shown in FIGS. 11 and 12 is a meter register 180 of the type discussed in WO 02/073735 and application Ser. No. 10/864,308. The register 180 includes a body 182 having a lens 184. A magnetic follower 186 housed in the body 182 is rotatably coupled by a drive shaft 187 to a circuit board 188 having a microprocessor (not shown). Magnetically-activated switches or reed switches 190 (only one shown in FIG. 11) are provided on the bottom surface of the circuit board 188 and are adapted to be activated and deactivated by the magnetic follower 186 in a manner discussed in WO 02/073735 and application Ser. No. 10/864,308. The microprocessor is coupled to the reed switches 190 and the battery 54. The reed switches 190 indicate rotation of the measuring chamber in a manner discussed in WO 02/073735 and application Ser. No. 10/864,308.

A light-emitting display (LED) or liquid crystal display (LCD) 194 (clearly shown in FIG. 12) is provided and electrically coupled to the circuit board 188 and the battery 54 in any convenient manner. Likewise, a stepper motor or stepper solenoid 196 is provided and electrically coupled to the microprocessor of the circuit board 188 and the battery 54. In one non-limiting embodiment of the invention, the stepper motor 196 is mechanically coupled to an odometer 198 (clearly shown in FIG. 12). The stepper motor 196 can be the same type of motor used in many battery-powered watches. For example but not limiting to the invention, the shaft of the stepper motor 196 rotates on the order of 3.6° per pulse and operates off of a DC power, e.g., the battery 54. A faceplate 200 is provided having appropriate cutouts for LCD or LED 194 and odometer display 198. The meter register 180 is adapted to be coupled or attached to a meter body, e.g., the meter body 12 (see FIG. 1), which has a magnetic drive arrangement, e.g., the magnetic drive arrangement 21 shown in FIG. 1.

A second stepper motor 205 is provided to drive the sweep hand 50. The stepper motor 205 is also coupled to the microprocessor. In operation, as water flows through the measuring chamber 14 of the meter or meter body 12, the water flow drives the magnetic drive arrangement 21 (see FIG. 1) in a first direction, e.g., a clockwise direction. With the meter register 180 shown in FIG. 11 mounted in the meter body 12 (see FIG. 1), the magnetic forces of the magnetic drive arrangement 21 causes the magnets 52 (see FIG. 2, 5, or 7) to, likewise, rotate in the first direction. Magnetic impulses activate and deactivate the reed switches 190 which indicate rotation of the magnetic drive arrangement 21 in the measuring chamber 14, and the reed switches 190 emit electrical pulses to the microprocessor. As can be appreciated, using the optical encoder of the invention and the optical encoder discussed in application Ser. No. 10/864,312, signals generated by the detectors of the optical encoder, e.g., detectors 76 and 78 of the optical encoders 42 and 124 discussed above are forwarded to the microprocessor as previously discussed. The microprocessor correlates pulses or signals from the detectors to a volume of flow and/or a flow rate and, in turn, sends a signal to the LED or LCD 194 to indicate the flow rate of the water through the meter 10. Alternatively, the LED or LCD 194 can indicate the volume of material that has flowed through the meter 10. Simultaneously, the circuit board 188, via the microprocessor, sends a signal to the stepper motor or the stepper solenoid 196, which causes a stepper motor or stepper solenoid shaft (not shown) to rotate, which, in turn, causes the odometer 198, a mechanical, gear driven device to indicate the volume of material that has flowed through the meter 10. Alternatively, the stepper motor or stepper solenoid 196 can drive the gearing coupled to the odometer 198.

In a non-limiting embodiment of the invention, the signal from the optical encoders 42 and 124 of the instant invention, the optical encoder discussed in application Ser. No. 10/864,308, or the reed switches of WO 02/073735 and application Ser. No. 10/864,308 sent to the microprocessor is acted on by the microprocessor to adjust the signal to represent the actual water flow through the meter, and the microprocessor forwards a pulse or pulses representing the adjusted signal to the LED, LCD, stepper solenoid, and/or the stepper motor. As can be appreciated, the manner of adjusting the signal representing the actual flow is not limiting to the invention.

Figure 13:
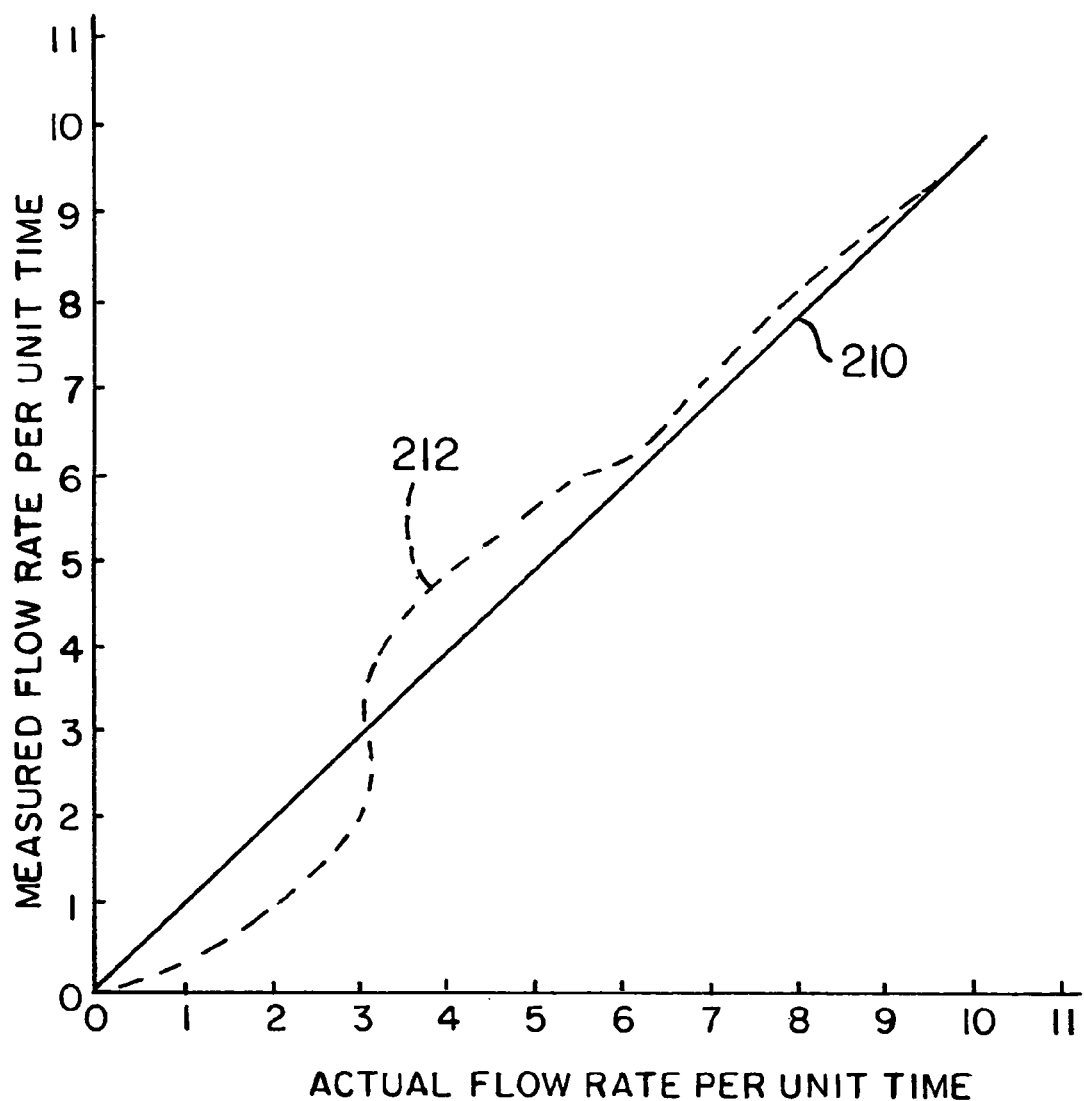
FIG. 13 is an exemplary graph having curves to show the difference between actual flow volume rate per unit time vs. measured flow volume rate per unit time.

In the following discussion of a non-limiting embodiment of the invention, the signal acted on is the signal from the detectors 76 and 78; however, as can be appreciated, the invention is not limited thereto. With reference to the graph of FIG. 13, there is shown a graph with line 210 showing a 100% accuracy of the measured flow per unit time. In other words, the measured flow rate per unit time equals the actual flow for the same unit of time. The curve 212 is representative of an exemplary meter showing the measured flow rate per unit time versus the actual flow per unit time. In our exemplary example, the measured flow rate per unit time for actual flow rate per unit time between 0-3 is less than the actual measured flow rate per unit time. The measured flow rate per unit time for actual flow rate per unit time between 3 and 6 is more than the actual flow rate per unit time. The measured flow rate per unit time for actual flow rate per unit time greater than 6 is shown similar to the actual flow rate per unit time but can be the same as the actual flow rate per unit time. A comparison of curves 210 and 212 shows that as the water flow rate per unit time increases, the measured flow rate per unit time more nearly or does represent the actual flow per unit time.

In accordance with the practice of a non-limiting embodiment of the invention, in our discussion of the exemplary meter, corrections are made to the signal from the detectors 76 and 78 for measured flow rate per unit time in the measured flow rate per unit time range of 0-3 to raise the measured flow rate per unit to more nearly represent, or to represent, the actual flow rate per unit time in the range of 0-3. Further, corrections are made to the signal from the detectors 76 and 78 for measured flow rate per unit time in the measured flow rate per unit time range of 3-6 to lower the measured flow rate per unit to more nearly represent, or to represent, the actual flow rate per unit time in the range of 3-6. Optionally, adjustments can be made to the signals from the detectors 76 and 78 for measured flow rate per unit time having a value greater than 6.

The invention is not limited to the technique used to determine an adjustment factor. In a non-limiting embodiment of the invention, an adjustment table is established showing the adjustment to the signal from the detectors 76 and 78 for incremental measured flow rates per unit time. As can be appreciated, the smaller the increments of adjustments, the smaller the difference between the measured flow rate per unit time and the actual flow rate per unit time. For example but not limiting to the invention, adjustments for portions of the curve 212 in increments of 0.5 would more nearly represent the line 210 than adjustments for portions of the curve 212 in increments of 1.5. The adjustment factor is added to the signal from the detectors 76 and 78.

The adjustment factors can be determined in any manner. For example but not limiting the invention thereto, with reference to FIG. 13, when the measured flow rate per unit time has a value of 1, the actual flow rate per unit time has a value of 2. In this instance, an increment of 1 is added to the signal of the measured flow rate per unit time.

Figure 14:
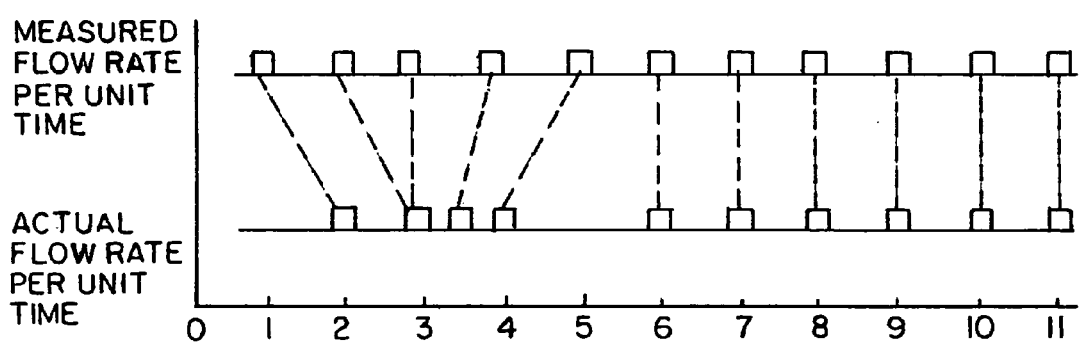
FIG. 14 is an exemplary line graph showing the relationship of pulses from reed switches of a meter register measuring the flow volume of water for a given time and the actual flow volume of water for the same given time.

In a non-limiting embodiment of the invention, an adjustment chart, e.g., chart shown in FIG. 14, is established showing the adjustment when the signal is made up of pulses, e.g., pulses from the reed switches 190 (only one switch shown in FIG. 11). As can now be appreciated, the smaller the incremental adjustments, the closer the measured flow rate per unit time is to the actual or corrected flow rate per unit time.

Using the above procedure, the under measured and over measured values provided by the signals from the detectors 76 and 78 or from the reed switches 190 are adjusted to more nearly or to represent the actual or corrected flow rate per unit time of water flowing through the meter at any given time.

Figure 15:
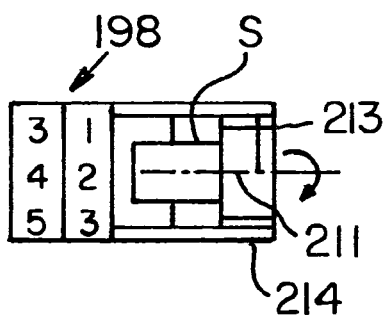
FIG. 15 is a side, elevated view of an odometer having portions removed to show the rotating stepper motor within the odometer in accordance with the teachings of the invention.

As can now be appreciated, the invention is not limited to the mechanisms used to display the measured or the adjusted measured water flow. For example, as discussed above, LED or LCD displays, or an odometer driven by a stepper motor are used to visually present on the dial the volume of water used. As can be appreciated and with reference to FIG. 15, using a stepper motor or stepper solenoids having a rotating shaft 211 mounted within the odometer 198 conserves space. In operation, as a pulse is sent to the stepper motor, the shaft 211 in engagement with vane 213 on inner surface of wheel 214 of the odometer 198 displaces the vane to rotate a wheel 214.

The form of the invention shown and described above represents illustrative non-limiting embodiments of the invention. It is understood that various changes may be made without departing from the teachings of the invention defined by the claimed subject matter

What is claimed is:

1. A meter register, comprising:
   a register body having a rotatable drive shaft coupled thereto;
   an energy passing member co-acting with the drive shaft such that as the shaft rotates the member rotates, the member having a first surface, an opposite second surface, a first portion having a predetermined percent transmission to wavelengths of the magnetic spectrum, and a second portion having a predetermined percent transmission to wavelengths of the magnetic spectrum, wherein the first predetermined percent transmission of the first portion is greater than the predetermined percent transmission of the second portion;
   a device to emit energy in a predetermined wavelength range of the electromagnetic spectrum along a path to impinge on the first surface of the member; and
   a pair of detectors mounted in spaced relationship to one another, wherein each of the pair of sensors generates a first signal when energy passing through the first portion of the energy passing member is incident thereon and each of the detectors generating a second signal when the energy emitted by the device is incident on the second portion of the energy passing member.

2. The meter register as claimed in claim 1, wherein the wavelength is in the range of greater than 300 nanometers.

3. The meter register as claimed in claim 2, wherein the device emits infrared energy.

4. The meter register as claimed in claim 1, wherein the member is a wheel and the first predetermined portion has a transmission of greater than 50 percent and the second portion has a transmission of less than 10 percent.

5. The meter register as claimed in claim 1, further comprising a drive magnet attached to the drive shaft, the device is mounted spaced from and facing the first surface of the member and the pair of detectors are mounted in spaced relationship to and facing the second surface of the energy passing member.

6. The meter register as claimed in claim 5, further comprising an electronic device acting on the first and second signals from the pair of detectors to provide a third signal representing measured flow volume of material, acting on the third signal to determine the difference between actual flow volume of material and the measured flow of material, and adjusting the signal to provide an adjusted signal, wherein the difference between the adjusted signal and the third signal is less than the difference between the third signal and the actual flow rate.

7. The meter register as claimed in claim 5, further comprising:
- an electronic device acting on the first and second signals from the pair of detectors to provide a third signal representing measured flow volume of material;
- a display to display the flow volume of material, the display comprising a plurality of wheels, each wheel having an arrangement of characteristics such that the characteristics on the wheel in a given position correspond to the measured volume flow; and
- a stepper motor mount within selected ones of the wheels and acted on by the measuring arrangement to rotate at least one of the plurality of wheels to present a readable measured volume flow rate.

8. The meter register as claimed in claim 1, wherein the energy passing member is a wheel having a predetermined surface area and the first portion subtends an angle of about 240°.

9. The meter register as claimed in claim 8, wherein the first portion subtends an angle of about 180°.

10. The meter register as claimed in claim 9, wherein the pair of detectors is at right angles to one another.

11. The meter register as claimed in claim 1, wherein the register is a register for a water meter.

12. A meter register, comprising:
- a register body having a rotatable drive shaft coupled thereto, a drive magnet attached to the drive shaft, at least one measuring arrangement co-acting with the drive shaft, and generating a signal representing measured flow volume of material; and
- an electronic device acting on the signal to determine the difference between actual flow volume of material and the measured flow of material, and adjusting the signal to provide an adjusted signal, wherein the adjustment is based upon the generated signal as a function of time that is indicative of the measured flow rate of fluid being measured and the adjusted signal is indicative of the actual volume of material being measured.

13. A meter register, comprising:
- a register body having a rotatable drive shaft coupled thereto, a drive magnet attached to the drive shaft;
- a measuring arrangement operationally connected to the drive shaft to measure flow volume of material;
- a display to display the flow volume of material, the display comprising a plurality of wheels, each wheel having an arrangement of characteristics such that the characteristics on the wheel in a given position correspond to the measured volume flow; and
- a stepper motor mount within selected ones of the wheels and acted on by the measuring arrangement to rotate at least one of the plurality of wheels to present a readable measured volume flow rate.

\* \* \* \* \*